US005712739A

United States Patent [19]
Nakamura et al.

[11] Patent Number: 5,712,739
[45] Date of Patent: Jan. 27, 1998

[54] MAGNETIC DISK DRIVE SYSTEM WITH A COMPOSITE HEAD UNIT INCLUDING A MAGNETORESISTIVE READ ONLY HEAD AND AN INDUCTIVE WRITE ONLY HEAD

[75] Inventors: Norio Nakamura, Yokohama; Yusuke Ohinata, Tokyo; Junichi Akiyama, Kawasaki; Nobuyasu Goto, Tokyo, all of Japan

[73] Assignee: Kabushiki Kaisha Toshiba, Kawasaki, Japan

[21] Appl. No.: 337,437

[22] Filed: Nov. 8, 1994

[30] Foreign Application Priority Data

Nov. 8, 1993 [JP] Japan .................................. 5-278445

[51] Int. Cl.$^6$ ........................... G11B 5/09; G11B 5/127
[52] U.S. Cl. ................................... 360/46; 360/113
[58] Field of Search .......................... 360/46, 67, 68, 360/113, 123, 124

[56] References Cited

U.S. PATENT DOCUMENTS

| 4,786,993 | 11/1988 | Jove et al. |           |
|-----------|---------|-------------|-----------|
| 5,103,353 | 4/1992  | Jove et al. |           |
| 5,132,852 | 7/1992  | Price, Jr.  | 360/68 X  |
| 5,311,377 | 5/1994  | Mitsuhashi et al. | 360/68 X |
| 5,416,645 | 5/1995  | Fukuyama    | 360/46    |
| 5,430,584 | 7/1995  | Petersen    | 360/46 X  |
| 5,434,717 | 7/1995  | Yoshinaga et al. | 360/46 |

FOREIGN PATENT DOCUMENTS 5-54161  8/1993  Japan .

*Primary Examiner*—Aristotelis M. Psitos
*Assistant Examiner*—Regina Y. Neal
*Attorney, Agent, or Firm*—Oblon, Spivak, McClelland, Maier & Neustadt, P.C.

[57] ABSTRACT

A magnetic disk drive system for writing data into a disk-shaped magnetic medium and reading data stored therein, comprises a first terminal, a second terminal, and at least one third terminal, a composite head unit including an inductive write head and at least one magnetoresistive read head which are connected in series between the first and second terminals, and at least one common connection node connected to the at least one third terminal, and a driving circuit connected to the first through third terminals. The driving circuit includes a write circuit for supplying a write current to the write head, a read circuit for supplying a sense current to the read head to generate a read signal, and a plurality of switches for connecting the write circuit to the write head and electrically disconnecting the read circuit from the composite head unit and the write circuit during writing, and for connecting the read circuit to the read head and electrically disconnecting the write circuit from the composite head unit and the read circuit during reading.

17 Claims, 9 Drawing Sheets

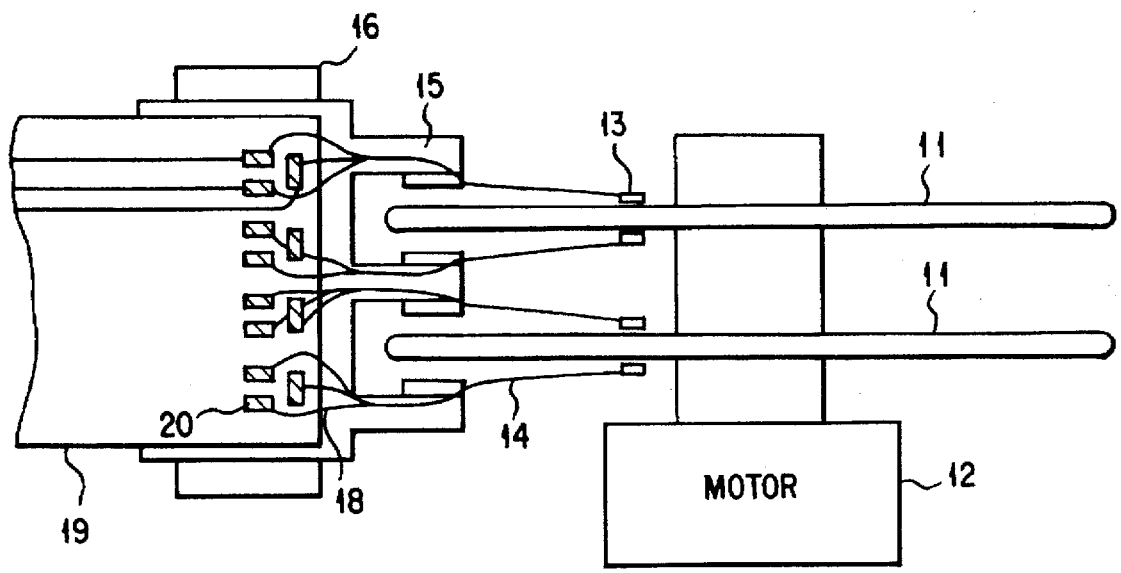
F I G. 2
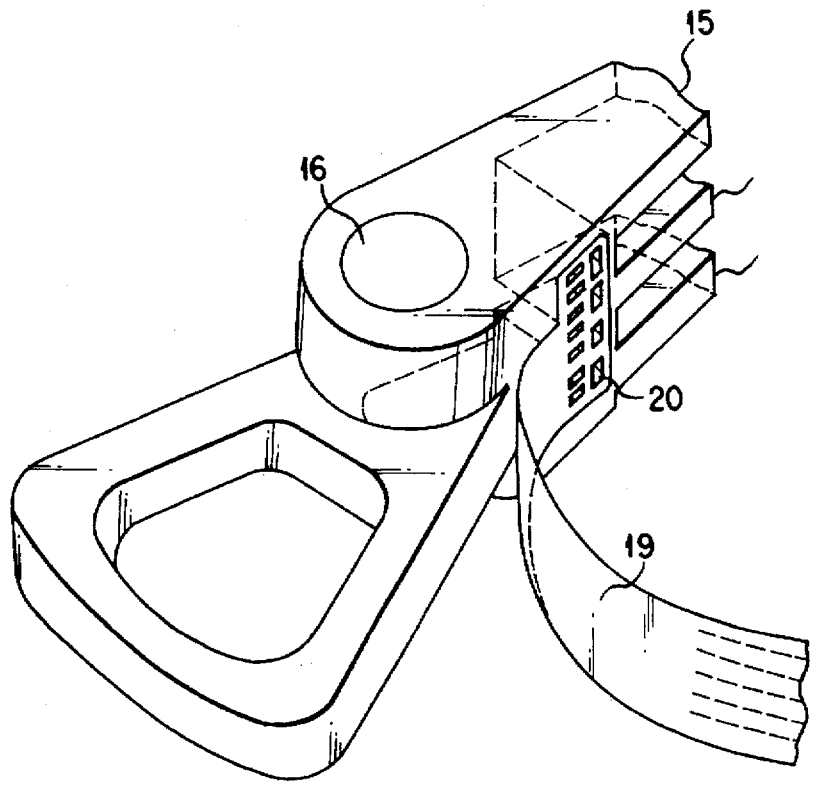
F I G. 3

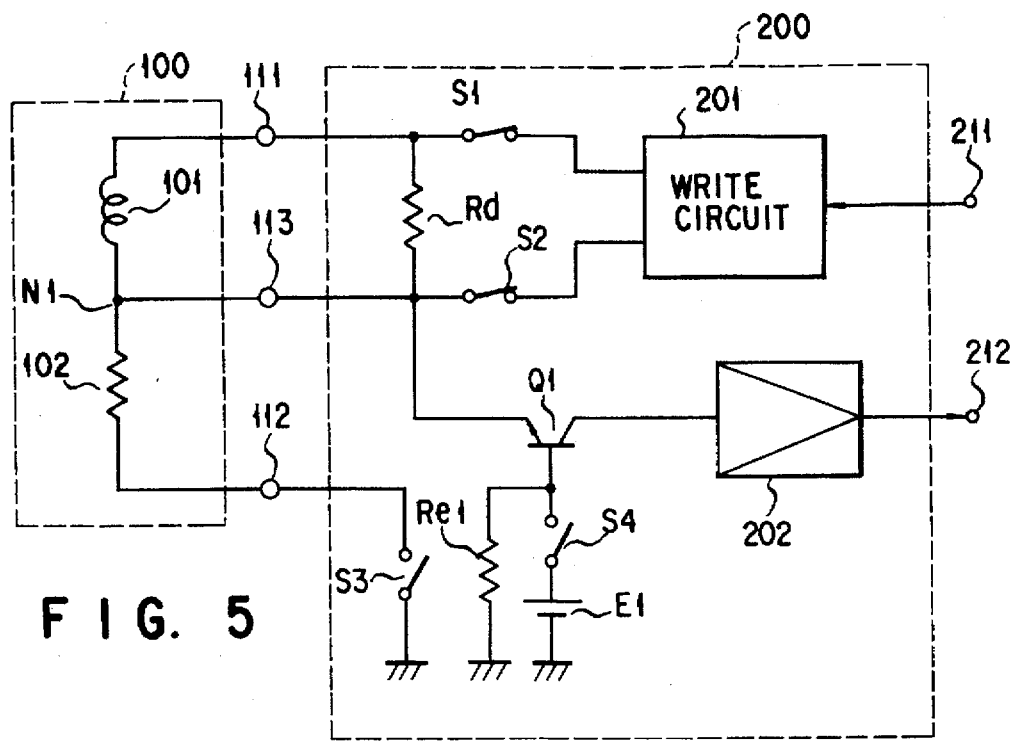
F I G. 5
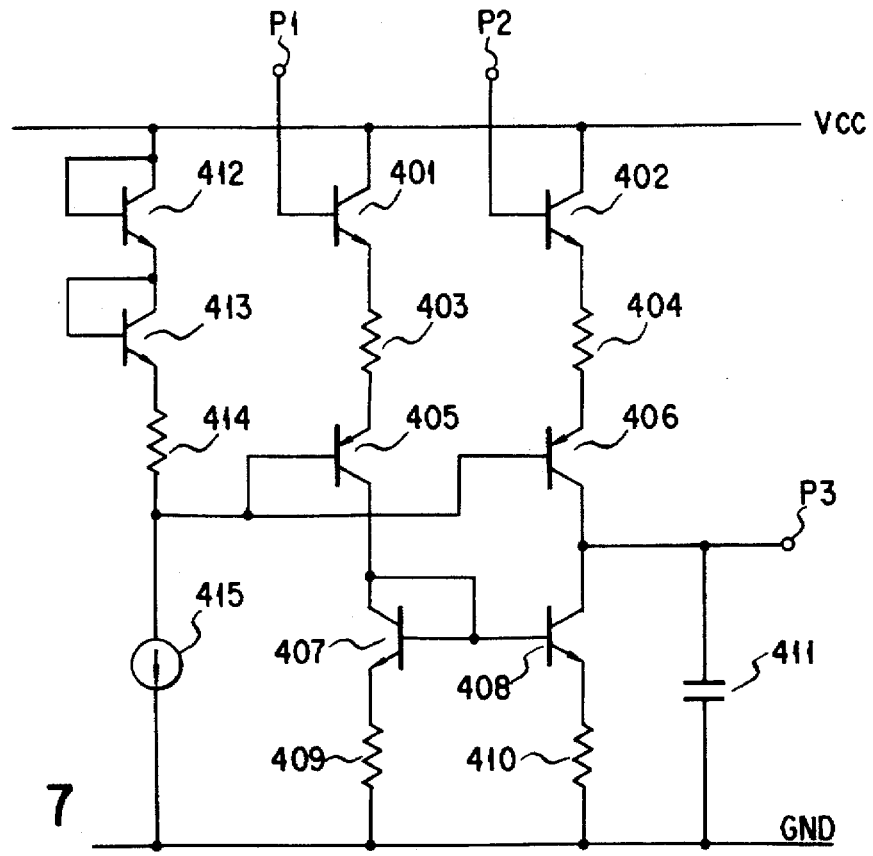
F I G. 7

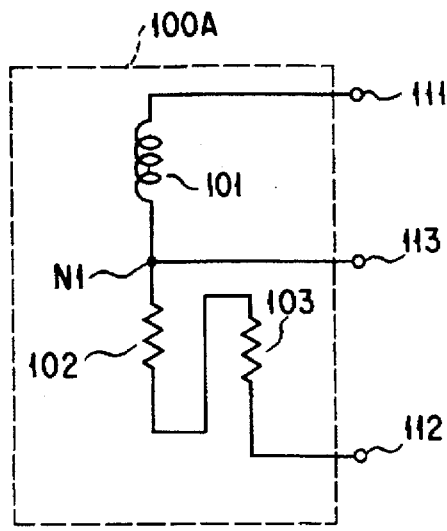
F I G. 10A
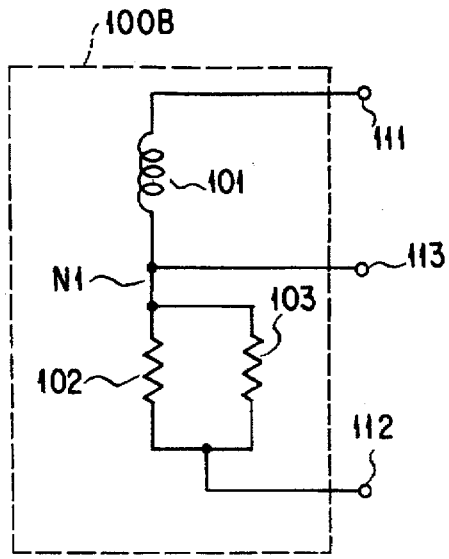
F I G. 10B
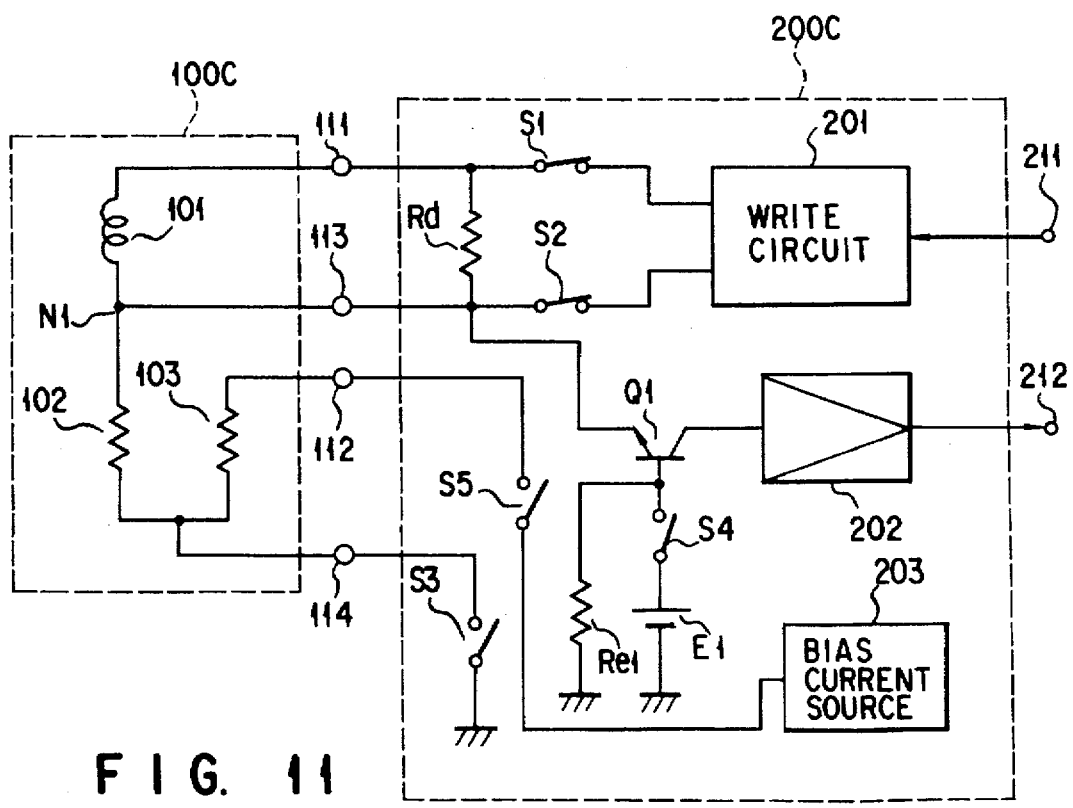
F I G. 11

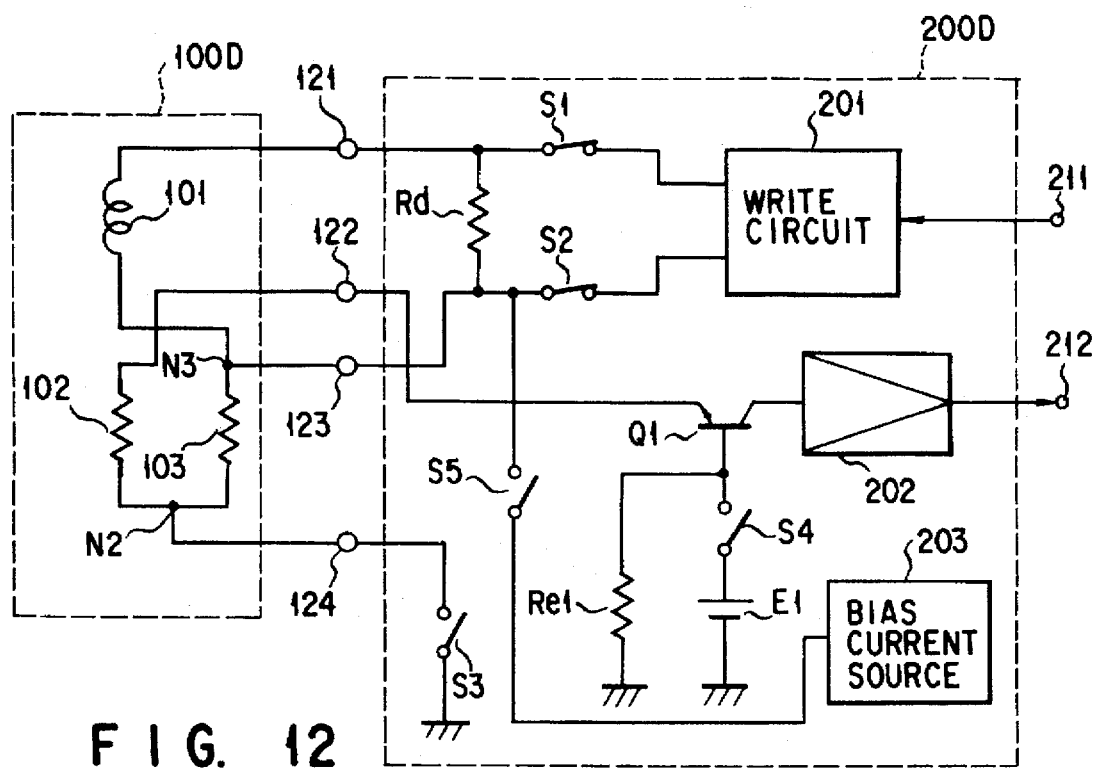
F I G. 12
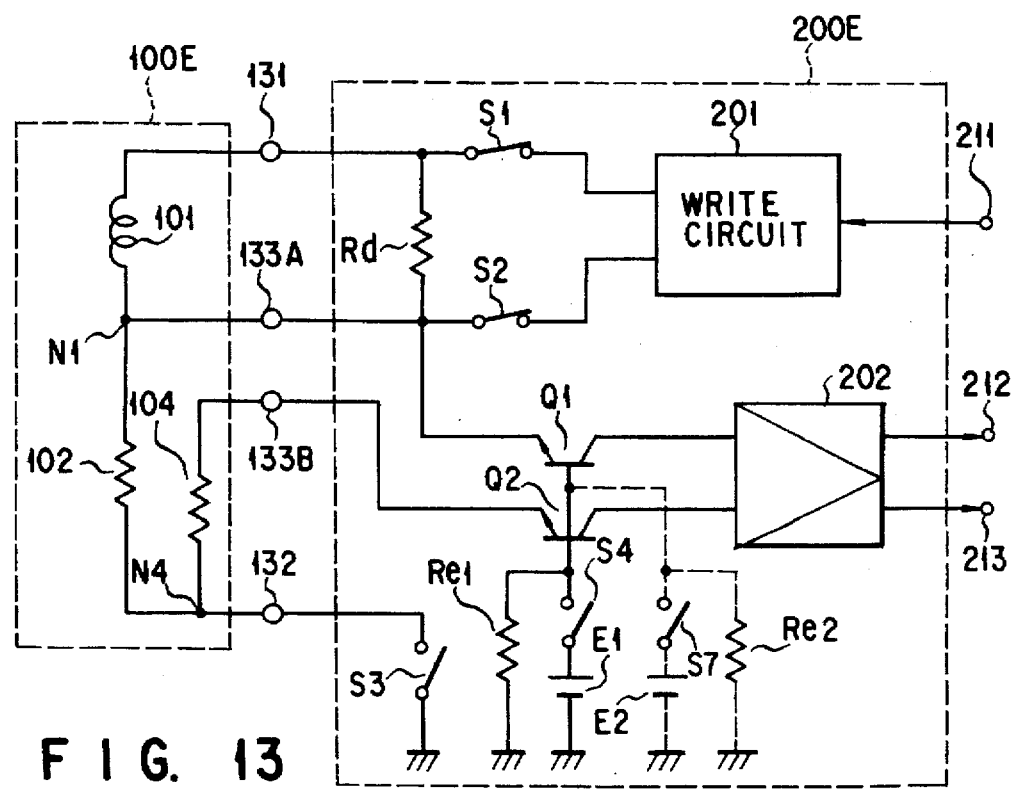
F I G. 13

MAGNETIC DISK DRIVE SYSTEM WITH A COMPOSITE HEAD UNIT INCLUDING A MAGNETORESISTIVE READ ONLY HEAD AND AN INDUCTIVE WRITE ONLY HEAD

BACKGROUND OF THE INVENTION

1. Field of the Invention

This invention relates to a magnetic disk drive system and, more particularly, to a magnetic disk drive system using a composite head unit consisting of a magnetoresistive read head and an inductive write head.

2. Description of the Related Art

In accordance with the development of high density writing, magnetic disk drive systems for writing data in a disk-shaped magnetic writing medium and reading the written data have come to use a magnetoresistive head (hereinafter called an "MR head") as a reproducing head with superior reproductivity. A read head of this type employs an MR (magnetoresistive) element which has an electrical resistance varying in accordance with the intensity of an external magnetic field. The MR head, in principle, is used only for reading, and hence generally used together with an inductive head. The MR head and the inductive head constitute a composite head unit.

The composite head unit has a larger number of lead terminals than that of an inductive head which is used for both writing and reading. For example, a composite head unit with an MR reading head of a SAL (soft adjacent layer) bias system has four lead terminals—two of which are connected to a write head and the other two of which are connected to a read head. Each of the lead terminals is connected to an end of a corresponding lead wire, the other end of which lead wire is connected to a substrate contained in the case of the magnetic disk drive system. In general, the lead wires are connected to the substrate by means of solder.

In the case of a compact hard disk drive system built in a personal computer, an increase in the lead terminals of a head, i.e., an increase in the number of portions connected with solder, raises a serious problem since the substrate has only small soldering spaces. Further, since there is a tendency to reduce the size of a head slider on which the head is mounted, an increase in lead terminals makes it difficult to attach lead wires to the head slider.

On the other hand, a driving circuit for a composite head unit is constituted by an IC (a driver IC). The driver IC comprises, as main structural elements, a write circuit for supplying a write current to a write head, and a read circuit for supplying a sense current to an MR read head to generate a read signal. In the case of using an MR head of the SAL bias system as a read head, four lead terminals are necessary for each composite head unit to connect the same to a corresponding driver IC, since a writing system and a reading system are completely separately connected to the composite head unit.

There is a demand these years for a magnetic disk drive system of a large capacity even if the system has a compact size. In accordance with this, there is a tendency to increase the number of heads installed in one magnetic disk drive system. A general hard disk drive system of 2.5 inches, for example, has 8 inductive heads at maximum which serve as write/read heads. In this case, the number of the terminals of the heads is 16. If the write/read heads are replaced with composite head units as described above, and if MR heads of the SAL bias system are used in the composite head units, the number of lead terminals between the heads and the driving circuits is as large as 32. In addition, if a system is employed in which a bias magnetic field is applied to the MR element of each MR head of composite head units as a result of flowing a bias current through a bias conductor located in the vicinity of the MR head, a further lead terminal is necessary for the bias conductor. Thus, the number of required lead terminals is further increased.

As explained above, in a compact magnetic disk drive system in particular, an increase in the lead terminals of a head makes it difficult to mount the head and also reduces the yield of products, due to narrow spaces for soldering or attaching lead wires to the head slider. In light of this, a decrease in required lead terminals is demanded.

SUMMARY OF THE INVENTION

It is a first object of the invention to provide a magnetic disk drive system having a composite head unit with a small number of lead terminals.

It is a second object of the invention to provide a magnetic disk drive system having a high S/N read circuit.

The first object can be attained by a magnetic disk drive system for writing data into a disk-shaped magnetic medium and reading data stored therein, which comprises a first terminal, a second terminal, and at least one third terminal; and a composite head unit including an inductive write head and at least one magnetoresistive read head which are connected in series between the first and second terminals, and at least one common connection node connected to the at least one third terminal.

The second object of the invention can be attained by employing a write circuit for supplying a write current to the write head; a read circuit for supplying a sense current to the read head to generate a read signal; and switch means for connecting the write circuit to the write head and electrically disconnecting the read circuit from the composite head unit and the write circuit during writing, and for connecting the read circuit to the read head and electrically disconnecting the write circuit from the composite head unit and the read circuit during reading, the read circuit including a transistor having an emitter thereof connected to an end of the read head, a load resistor connected between the collector of the transistor and a power supply terminal, and a constant current source connected parallel to the load resistor.

Further, the present invention provides a magnetic disk drive system for writing data into a disk-shaped magnetic medium and reading data stored therein, comprising: a composite head unit including an inductive write head and at least one magnetoresistive read head; a write circuit for supplying a write current to the write head; a read circuit for supplying a sense current to the read head to generate a read signal; and switch means for connecting the write circuit to the write head and electrically disconnecting the read circuit from the composite head unit and the write circuit during writing, and for connecting the read circuit to the read head and electrically disconnecting the write circuit from the composite head unit and the read circuit during reading.

Moreover, the present invention provides an integrated circuit apparatus for driving a composite head unit having an inductive write head and at least one magnetoresistive read head, comprising: a write circuit for supplying a write current to the write head; a read circuit for supplying a sense current to the read head to generate a read signal; and switch means for connecting the write circuit to the write head and electrically disconnecting the read circuit from the composite head unit and the write circuit during writing, and for connecting the read circuit to the read head and electrically disconnecting the write circuit from the composite head unit and the read circuit during reading.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a side view, showing an essential part of the system of FIG. 1;

FIG. 3 is a perspective view, showing a head actuator portion of the system of FIG. 1;

FIG. 5 is an equivalent circuit diagram, showing an embodiment of the composite head unit and a driving circuit;

FIG. 7 is a circuit diagram, showing a potential control circuit incorporated in the circuit of FIG. 6;

FIGS. 10A and 10B are equivalent circuit diagrams, showing further embodiments of the composite head unit;

FIG. 11 is an equivalent circuit diagram, showing another embodiment of the composite head unit and the driving circuit;

FIG. 12 is an equivalent circuit diagram, showing a further embodiment of the composite head unit and the driving circuit; and FIG. 13 is an equivalent circuit diagram, showing a furthermore embodiment of the composite head unit and the driving circuit.

DETAILED DESCRIPTION OF THE PREFERRED EMBODIMENTS

Figure 1:
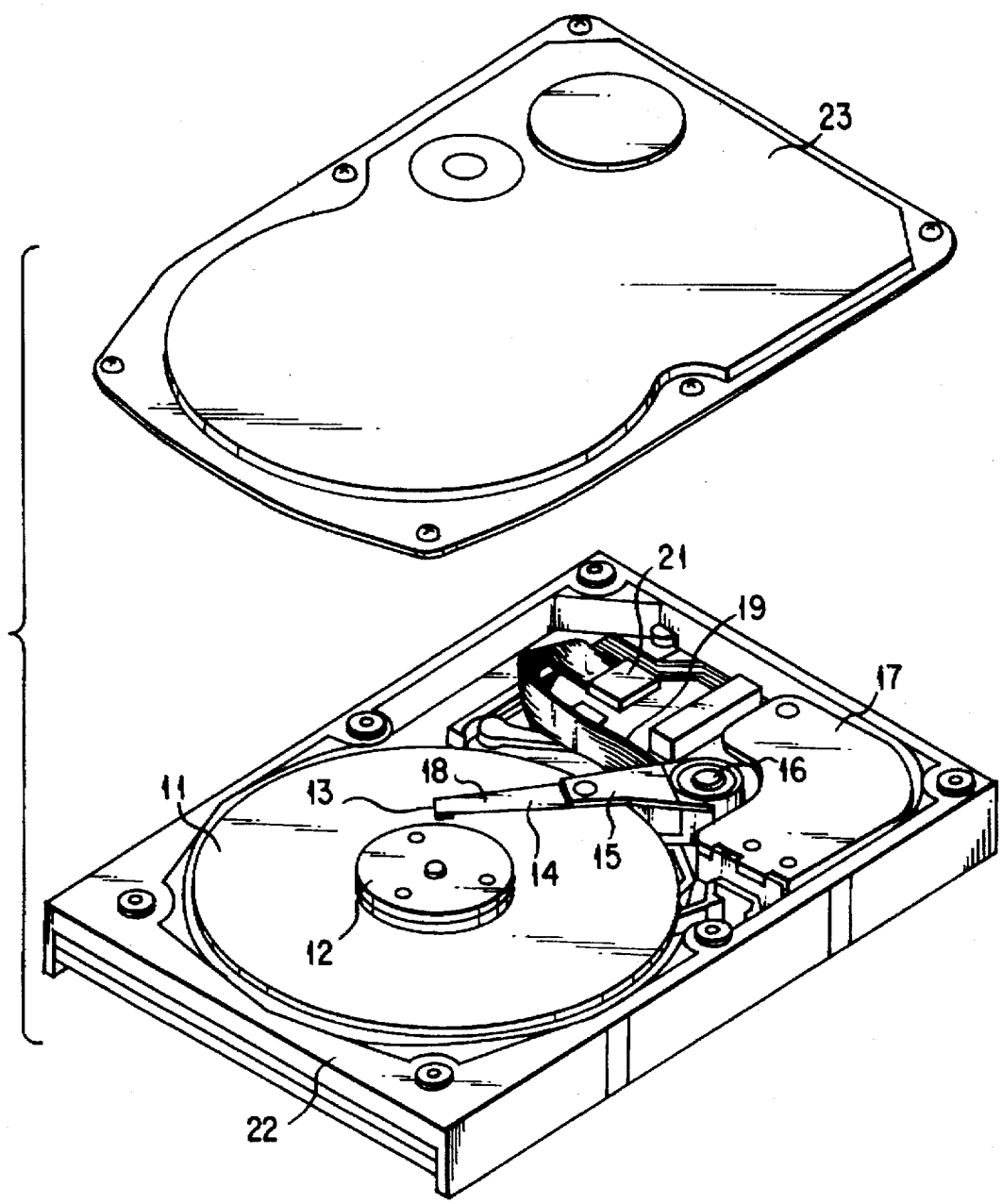
FIG. 1 is a schematic perspective view, showing the overall structure of a magnetic disk drive system according to a first embodiment of the invention.

The overall structure of a magnetic disk drive system according to an embodiment of the invention will be explained with reference to FIGS. 1-3. A plurality (two in this embodiment) of magnetic disks 11 are rigid disk-shaped magnetic writing media, so-called hard disks. These disks are mounted on a spindle motor 12 at a predetermined interval, and are rotated at a predetermined speed. A plurality (four in this case) of magnetic heads 13 are supported on tip ends of thin-plate suspensions 14 such that they can oppose the both surfaces of each magnetic disk 11. During writing and reading, each of the magnetic heads 13 is positioned slightly above a corresponding surface of a corresponding magnetic disk 11. The proximal end of each suspension 14 is fixed to a tip of a corresponding head arm 15. The proximal ends of all the head arms 15 are formed integral as one body and fixed to a common pivot 16. The pivot 16 is rotatably supported by a ball bearing (not shown). The pivot 16 is rotated by a voice coil motor 17, which is constituted by a coil (not shown) fixed to the integral end of the arms 15, and a magnetic circuit consisting of a magnet and a yoke (not shown) and interacting with the coil. In accordance with the rotation of the pivot 16, the arms 15 and the suspensions 14 angularly move over the surfaces of the magnetic disks 11. As a result of the angular movement, each magnetic head 13 accesses a desired track on a corresponding disk 11.

As will be explained hereafter, the magnetic head 13 is a composite head unit having three terminals, which are connected to lead wires 18, respectively. The lead wires 18 are arranged along each suspensions 14 and each arms 15. The other end of each lead wire 18 is fixed, by means of solder, to a corresponding land 20 located at an end portion of a flexible cable 19. The other end of the flexible cable 19 is connected to a driving IC 21 whose structure will be explained later.

The above-described elements are contained in a case 22 and covered with a thin plate cover 23 from the above.

Figure 4:
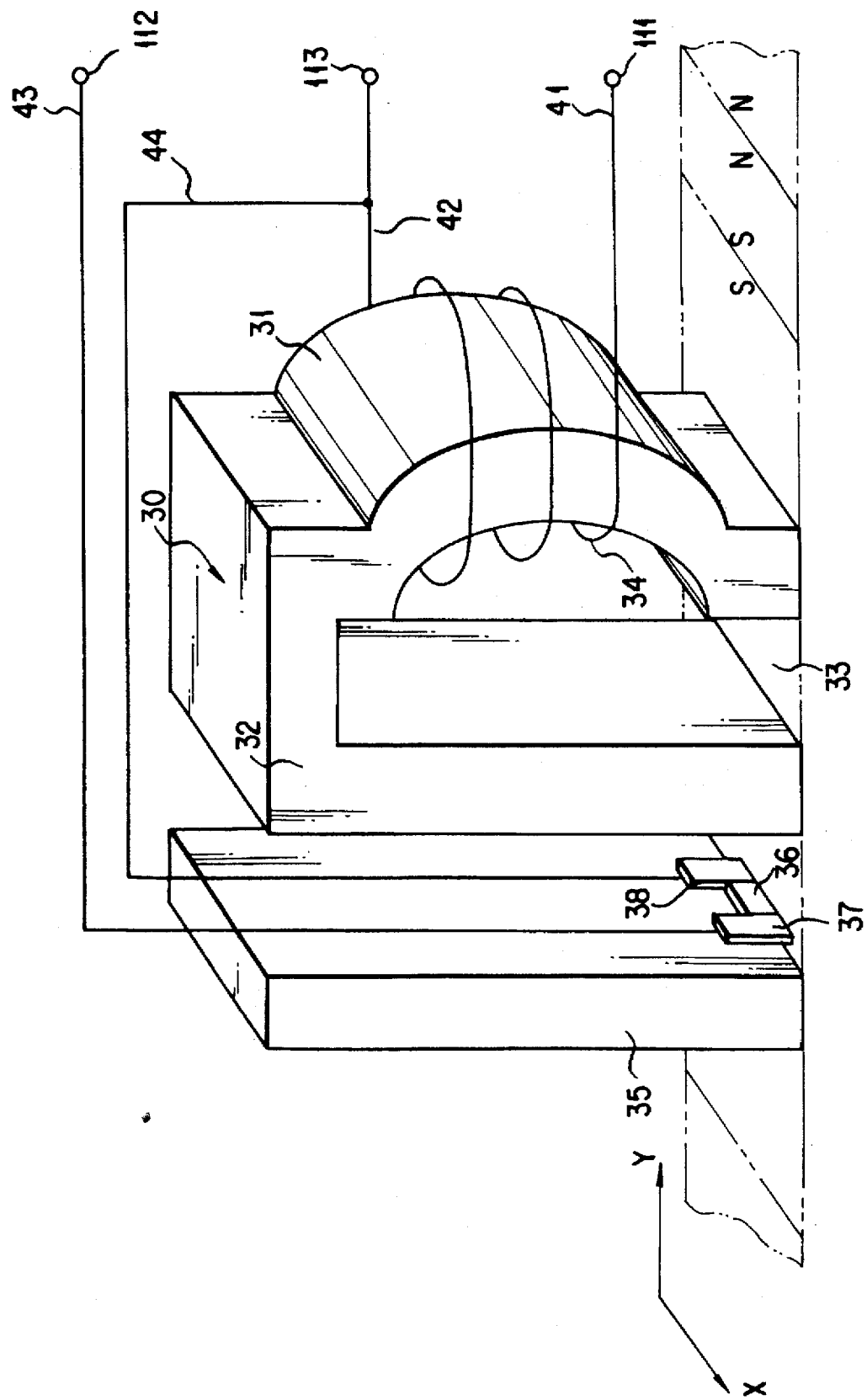
FIG. 4 is a schematic perspective view, showing an embodiment of a composite head unit.

FIG. 4 shows an example of the composite head unit used as the magnetic head 13. The composite head unit is constituted by an inductive write head and an MR read head which are assembled as one body. As is shown in FIG. 4, a written magnetization pattern is indicated by a two-dot imaginary line. N and S indicate the polarities of the written magnetization pattern. The inductive write head consists of a magnetic core 30 with a gap 33 for writing, and a write coil 34 wound on a magnetic pole 31 of the core 30. The length of the gap 33 (gap length) in the longitudinal direction (indicated by arrow Y) of the write track is, for example, about 0.3–0.6 μm. The MR read head is constituted by the other magnetic pole 32 of the magnetic core 30, a shield conductor 35 opposed to the pole 32 in the longitudinal direction of the write track and separated therefrom by about 0.3 μm, an MR film element 36 located in a gap between the magnetic pole 32 and the shield conductor 35, and lead conductors 37 and 38 connected to the opposite ends of the MR element 36 in the width direction (indicated by arrow X) of the write track.

Lead wires 41 and 42 leading from the opposite ends of the write coil 34 of the inductive write head are connected to terminals 111 and 113, respectively. Lead wires 43 and 44 leading from the lead conductors 37 and 38 of the MR read head are connected to the terminals 112 and 113, respectively. In other words, the lead wires 42 and 44 are commonly connected to the terminal 113.

When a write current has flown through the terminals 111 and 113, a written magnetization pattern is formed on the magnetic disk 11 by a leakage flux from the gap 33, i.e., data is written. The MR element 36 has its resistance varied when a magnetic field caused by the written magnetization pattern has been applied thereto. At this time, if a sense current is supplied to the MR element 36 through the terminals 112 and 113, a variation in resistance can be detected as a variation in current from the terminals 112 and 113. Reading is performed by detecting a variation in current.

FIG. 5 is an equivalent circuit diagram, showing a composite head unit 100 used as the magnetic head 13 and a driving circuit 200 for driving the unit 100. As described above, the composite head unit 100 has an inductive write head 101 and a MR read head 102 which are connected in series between the first and second terminals 111 and 112. The first terminal 111 is drawn from an end of the write head 101, the third terminal 113 is drawn from a common connection node N1 which connects the other end of the write head 101 and an end of the read head 102, and the second terminal 112 is drawn from the other end of the read head 102. Thus, the composite head unit 100 has three terminals.

The driving circuit 200 is connected to the terminals 111–113 drawn from the composite head unit 100. As described above, the circuit 200 is constituted by an IC (driver IC 21), and mainly comprises a write circuit 201 for supplying a write current to the write head 101, and a read circuit 202 for supplying a sense current to the read head 102 to generate a read signal. The input terminal of the write circuit 201 is connected to a signal input terminal 211 connected to an external circuit. The two output terminals of the write circuit 201 are connected via switches S1 and S2 to the terminals 111 and 113 drawn from the opposite ends of the write head 101, respectively. A damping resistor Rd is connected between the terminals 111 and 113 for controlling the waveform of the write current to be supplied to the write head 101. The switches S1 and S2 are turned on during writing to thereby supply the write current to the write head 101, and turned off during reading to thereby electrically disconnect the write circuit 101 from the composite head unit 100.

The read circuit mainly comprises a transistor Q1, a voltage source El, a bias resistor Rel and an amplifier 202. The transistor Q1 has a collector connected to the input terminal of the amplifier 202, an emitter connected to the terminal 113, and a base connected to the voltage source E1 via a switchs 4. The base of the transistor Q1 is further grounded via the bias resistor Rel. A switch S3 has an end connected to the terminal 112 and the other end grounded. The transistor Q1 functions as a base-grounded amplifier for supplying the read head MR1 with a constant voltage during reading, thus supplying the sense current. As a result, a variation in the resistance of the read head 102 due to writing magnetization on the magnetic disk is detected on the basis of a variation in current. The current variation is amplified in the amplifier 202, and then supplied as a read output to a signal output terminal 212 connected to an external circuit.

The switch S4 is turned off during writing to thereby turn off the transistor Q1, and turned on during reading to turn on the same. The switch S3 is turned off during writing to interrupt the supply of the sense current to the read head 102 and also the supply of a read signal from the read head 102, while being turned on during reading to allow the supply of the read signal. Thus, the switches S3 and S4 and the transistor Q1 are turned off during writing to electrically disconnect, from the composite head unit 1, the read circuit including the transistor Q1 and the amplifier 4.

The operation of the above embodiment will now be explained.
<During Writing>

In general, the magnetic disk drive system does not perform writing and reading simultaneously. Therefore, it is not necessary to supply the sense current to the read head 102 while the write current is supplied to the write head 101. In light of this, to supply the write current from the write circuit 201 to the write head 101 during writing, the switches S1 and S2 are turned on and the switches S3 and S4 are turned off. Turning off the switch S3 electrically disconnects the read head 102 from the driving circuit 201. Turning off the switch S4 causes a backward bias voltage to be applied between the base and the emitter of the transistor Q1, thereby turning off the transistor Q1. In other words, the write circuit 201 performs the same operation as in the conventional case where only the write head 101 and the damping resistor Rd are connected to each other, and the write circuit 201 is free from the influence of the read head 102 or the read circuit.
<During Reading>

During reading, the switches S1 and S2 are turned off so as to electrically disconnect the write circuit 201 from the composite head unit 100 and the read circuit. On the other hand, the switches S3 and S4 are turned on. Accordingly, that end of the read head 102 which is connected to the terminal 112 is grounded, and the other end of the head 102 which is connected to the terminal 113 is supplied with a DC voltage from the transistor Q1. As a result, the sense current is supplied to the read head 102.

The read head 102 has its resistance varied as a result of receiving with its MR element a magnetic field which is caused by writing magnetization on the magnetic disk. In accordance with a variation in resistance, the collector current of the transistor Q1 varies. In other words, data stored in the magnetic disk is detected on the basis of a variation in the collector current of the transistor Q1. The collector current variation of the transistor Q1 is amplified by the amplifier 202, and is taken as a read output from a signal output terminal 212.

At this time, the inductive write head 101 generates an induced electromotive force as a result of written magnetization on the magnetic disk, thereby generating a voltage between its opposite ends. However, the impedance of the transistor Q1 which forms the base-grounded amplifier is very low when viewed from the emitter side of the transistor Q1, so that the transmission of the voltage of the read head 101 due to the induced electromotive force to the amplifier 202 is interrupted by the transistor Q1.

As described above, the composite head unit 100, which has only three terminals less than the conventional composite head unit, can realize reliable writing and reading without interaction between the write system and the read system, as in the case of completely separating the write head and the read head.

Figure 6:
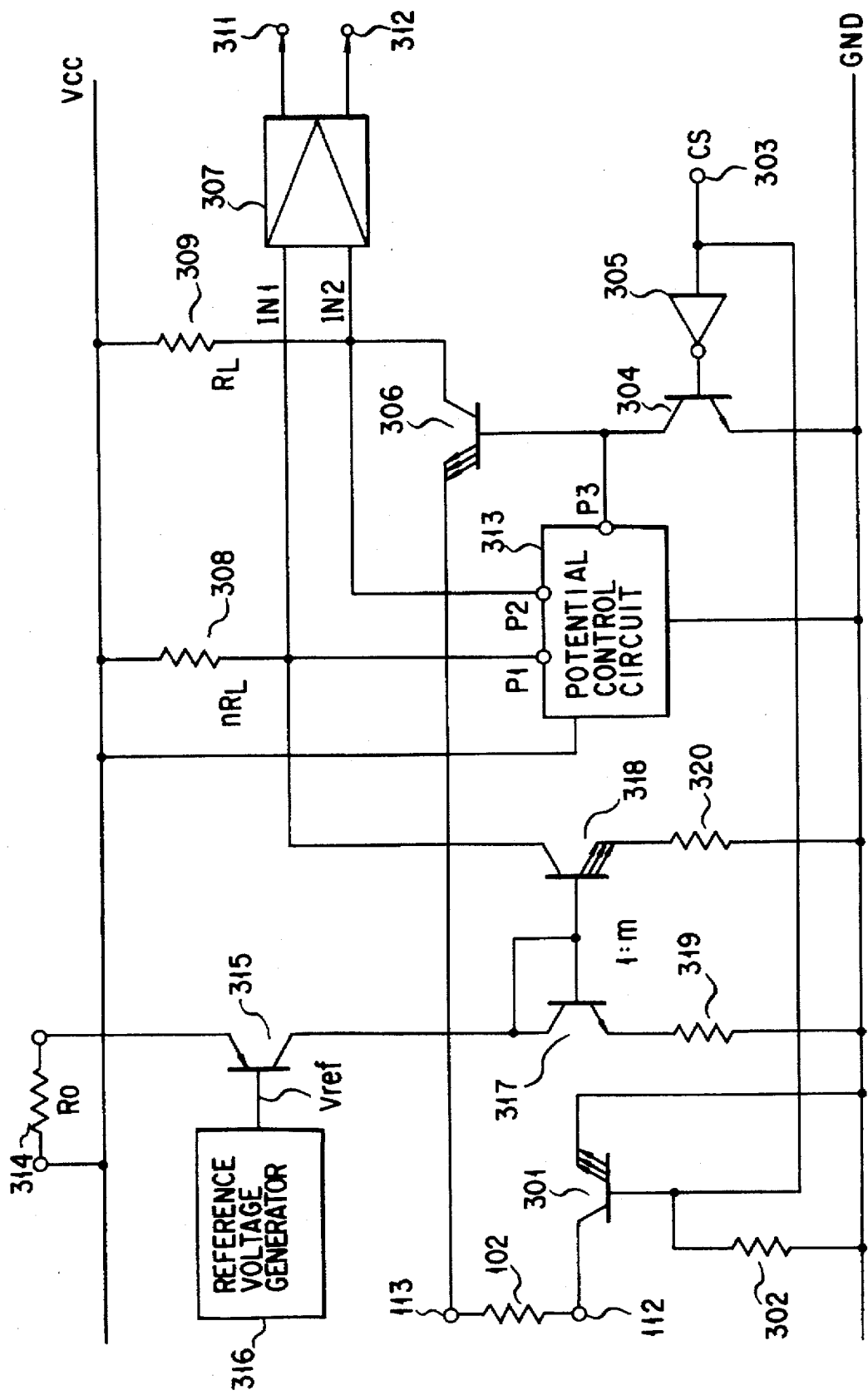
FIG. 6 is a circuit diagram, showing an embodiment of a read circuit incorporated in the circuit of FIG. 5.

FIG. 6 shows in more detail the circuit of the read system of the driving circuit 200 of FIG. 5. An NPN transistor 301 corresponds to the switch S3 of FIG. 5, and has a collector connected to the terminal 112, an emitter connected to a ground terminal GND, and a base connected to the ground terminal GND via a resistor 302 and also connected to a control terminal 303. The NPN transistor 304 corresponds to the switch S4 of FIG. 5, and has an emitter connected to the ground terminal GND, a base connected to the control terminal 303 via an inverter circuit 305, and a collector connected to the base of a NPN transistor 306. The transistor 306 corresponds to the transistor Q1 of FIG. 5, and constitutes a base-grounded amplifier. The emitter of the transistor 306 is connected to the terminal 113.

A differential amplifier 307 corresponds to the amplifier 202 of FIG. 5, and has first and second input terminals IN1 and IN2 connected to a resistor 308 and a load resistor 309, respectively. Where the load resistor 309 has a resistance of $R_L$, the resistance of the resistor 308 is set to $nR_L$ (n>1). In other words, the ratio between the resistances of the resistors 308 and 309 is n:1. The second input terminal IN2 is also connected to the collector of the transistor 306. The other end of each of the resistors 308 and 309 is connected to a power supply terminal Vcc. The two differential output terminals of the differential amplifier 307 are respectively connected to signal output terminals 311 and 312 which correspond to the signal output terminal 212 of FIG. 5.

The input terminals IN1 and IN2 of the differential amplifier 307 are further connected to the first and second input terminals P1 and P2 of a potential control circuit 313, respectively. The output terminal P3 of the circuit 313 is connected to the base of the transistor 306. A resistor 314 functioning as an exterior element for the driver IC has an end connected to the power supply terminal Vcc, and the other end connected to the emitter of an NPN transistor 315. The transistor 315 is used as a power supply, and has a base supplied with a reference voltage Vref from a reference voltage generator 316. The collector of the transistor 315 is connected to that collector of an NPN transistor 317 which is connected to the base of the same in a diode fashion. The transistor 317 and an NPN transistor 318 constitute a first current mirror circuit, and the base of the transistor 317 is connected to the base of the transistor 318. The collector of the transistor 318 is connected to the first input germinal IN1 of the differential amplifier 307. The emitters of the transistors 317 and 318 are connected to the ground terminal GND via resistors 319 and 320, respectively. The emitter areas of the transistors 317 and 318 differ from each other. The ratio between the emitter areas is 1:m (m>1). The ratio between the resistances of the resistors 319 and 320 is m:1.

The potential control circuit 313, the resistor 314, the transistor 315, the reference voltage generator 316, the transistors 317 and 318 and the resistors 319 and 320 constitute the voltage source E1 shown in FIG. 5. The output terminal P3 of the potential control circuit 313 corresponds to the output terminal of the voltage source E1.

In the structure of FIG. 6, a control signal CS is supplied to the base of the transistor 301 which corresponds to the switch S5 in FIG. 5, and is further supplied via the inverter circuit 305 to the base of the transistor 304. The control signal CS is set at low level during writing, and set at high level during reading. Accordingly, the transistor 301 is set in the off-state during writing, and set in the on-state during reading. On the other hand, the transistor 304 is set in the on-state during writing, and set in the off-state during reading. Further, in FIG. 6, the output terminal P3 of the potential control circuit 313 corresponding to the output terminal of the voltage source E1 in FIG. 5 is connected to the base of the transistor 306, without an element corresponding to the switch S4 interposed therebetween, and is also connected to the collector of the transistor 304 corresponding to the switch S4. However, if the on/off operations of the transistor 304 are performed in a reverse manner as compared with the switch S4 so that the transistor 304 can operate complementally to the transistor 301 corresponding to the switch S3, the FIG. 6 structure can operate in the same manner as the FIG. 5 structure.

The potential control circuit 313 controls the base potential of the transistor 306 so that the same DC potential can pass the input terminals IN1 and IN2 of the differential amplifier 307, i.e., a DC offset voltage of 0V can be generated from the output terminal of the amplifier 307. This control makes a voltage drop at the resistor 308 equal to that at the resistor 309. Thus, the current flowing through the load resistor 309 is determined from the current flowing through the resistor 308. A constant current is supplied from the current mirror circuit to the resistor 308. The input terminal of the current mirror circuit, i.e., the collector of the transistor 317 which is connected to the base thereof in a diode fashion receives, from the collector of the transistor 315, a constant DC current determined on the basis of the reference voltage Vref from the reference voltage generator 316 and the resistance of the resistor 314. The output terminal of the current mirror circuit, i.e., the collector of the transistor 318, is connected to a connection node between the first input terminal IN1 of the differential amplifier 307 and the resistor 308.

During reading, a sense current flows from the transistor 306 to the MR reading head 102. The load resistor 309 converts to a variation in voltage, a variation in the collector current of the transistor 306 corresponding to a variation in the resistance of the head 102. The voltage variation is amplified by the differential amplifier 307, and taken as a reading signal output from the output terminals 311 and 312. The sense current flowing through the load resistor 309 has a relatively high value of several—ten and several mA. It is not preferable to supply the resistor 308 with a current of the same value of the sense current since the current consumption of the driver IC is increased. Since in the embodiment, the resistance of the resistor 308 is set n-times higher than that of the load resistor 309, the current flowing through the resistor 308 is 1/n of the current flowing through the resistor 309, and hence the current consumption of the driver IC is reduced. Further, since the ratio between the emitter areas of the transistors 317 and 318 and that between the resistances of the resistors 319 and 320 are both set to 1:m, the sense current is set to a value, which is (m×n) times higher than the collector current of the transistor 315 determined on the basis of the resistance of the resistor 314 and the reference voltage vref.

FIG. 7 shows a specific structure of the potential control circuit 313. As is shown in FIG. 7, NPN transistors 401 and 402 have their bases connected to the input terminals P1 and P2 of the potential control circuit 313, respectively, also have their collectors connected to a power supply terminal vcc, and have their emitters connected to the emitters of PNP transistors 405 and 406 via resistors 403 and 404, respectively. The collectors of the transistors 405 and 406 are connected to the collectors of NPN transistors 407 and 408, respectively. The transistors 407 and 408 constitute a current mirror circuit. The collector and base of the transistor 407 are connected to each other in a diode fashion. The base of the transistor 407 is connected to the base of the transistor 408. The emitters of the transistors 407 and 408 are connected to the ground terminal GND via resistors 409 and 410, respectively. A common connection node which connects the collector of the transistor 406 to the collector of the transistor 408 is connected to the output terminal P3 of the potential control circuit 313, and also connected to the ground terminal GND via a capacitor 411.

Transistors 412 and 413, each of which has its base and collector connected in a diode fashion, a resistor 414 and a constant current source 415 are connected in series. The resistor 414 and the constant current source 415 are connected to a common connection node, to which the bases of the transistors 405 and 406 are commonly connected. The transistors 412 and 413 are provided for compensating the temperatures of the transistors 401, 402, 405 and 406, while the resistor 414 performs level shifting to control the base DC potentials of the transistors 405 and 406 to predetermined values. The resistors 403 and 404 are made to have the same resistance, and the resistors 409 and 410 are made to have the same resistance.

When a potential difference has occurred between the input terminals P1 and P2 of the potential control circuit 313, a difference occurs in the current flowing into the emitters of the transistors 405 and 406 via the transistors 403 and 404. The collectors of the transistors 405 and 406 are connected to the collectors of the transistors 407 and 408.

Since the transistors 407 and 408 constitute a current mirror circuit, their collectors receive the same current. Accordingly, the capacitor 411 connected to the collector of the transistor 406 performs charge/discharge corresponding to a difference in the collector currents of the transistors 405 and 406, with the result that the potential of the capacitor 411 varies.

When the potential of the input terminal P1 (corresponding to the potential of the first input terminal IN1 of the differential amplifier 307 in FIG. 6) is higher than the potential of the input terminal P2 (corresponding to the potential of the second input terminal IN2 of the differential amplifier 307), the collector current of the transistor 406 becomes lower than that of the transistor 405, thereby causing the capacitor 411 to discharge and hence reducing the potential of the output terminal P3. As a result, the collector current of the transistor 306 in FIG. 6 reduces, and the potential of the input terminal IN2 increases toward the potential of the input terminal IN1. On the other hand, when the potential of the input terminal P1 is lower than that of the input terminal P2, the collector current of the transistor 406 is higher than that of the transistor 405, and therefore the capacitor 411 is charged with electricity and the potential of the output terminal P3 increases. As a result, the collector current of the transistor 306 increases, and the potential of the input terminal IN2 reduces toward the potential of the input terminal IN1. As described above, the potential control circuit 313 operates to make the potentials of its input terminals IN1 and IN2 equal to each other.

Figure 8:
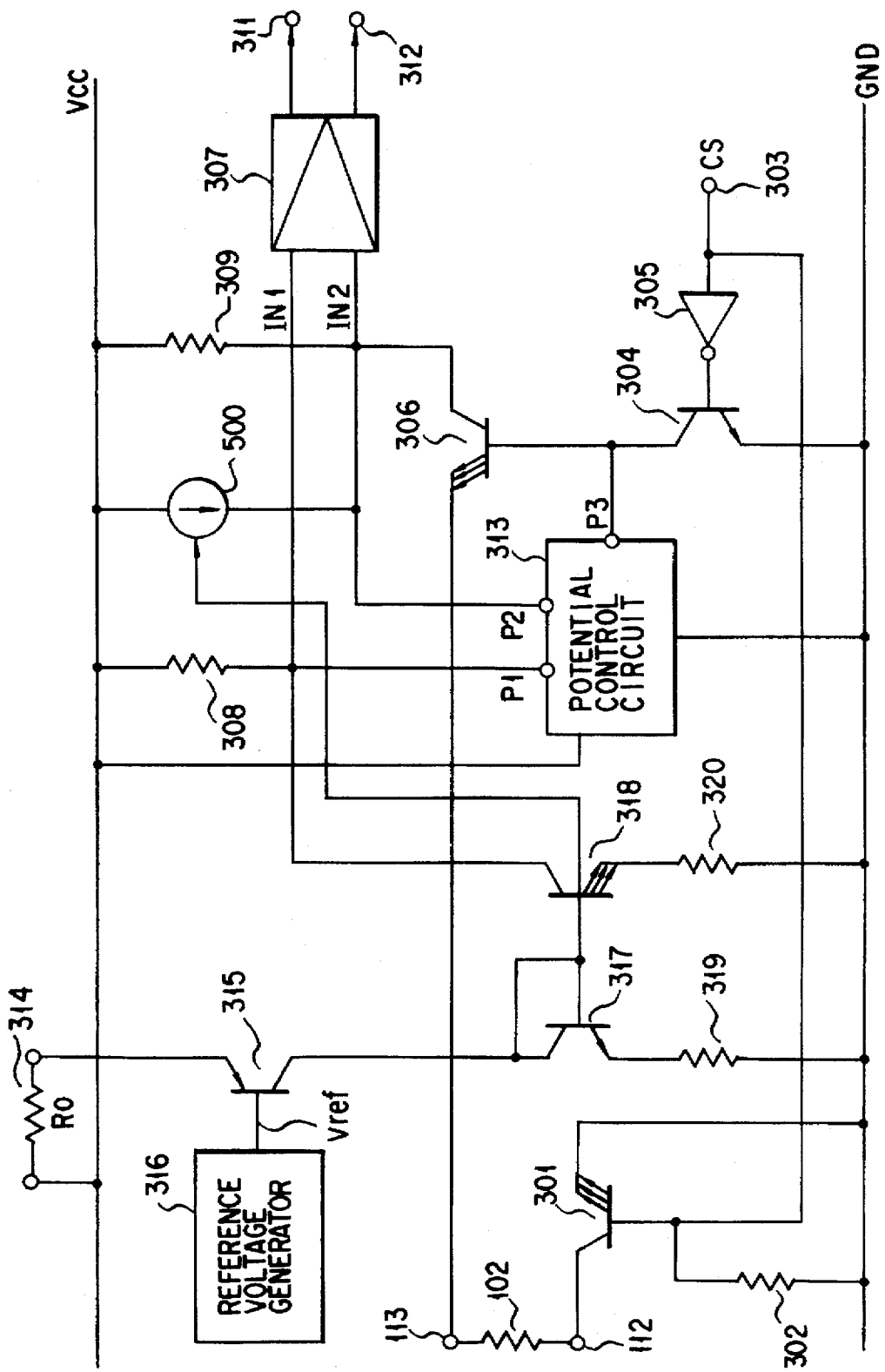
FIG. 8 is a circuit diagram, showing another embodiment of the read circuit of FIG. 5.

FIG. 8 shows an improved structure of the driving circuit 200. The FIG. 8 structure differs from the FIG. 6 structure only in that it additionally employs a constant current source 500 connected parallel to the load resistor 309. The output current of the constant current source 500 is determined on the basis of the base potentials of the transistors 317 and 318 which constitute the first current mirror circuit, and corresponds to the value of the sense current to be supplied to the MR read head 102. The constant current source 500 provides the following advantage:

The transistor 306 which constitutes a base-grounded amplifier detects a voltage drop at the load resistor 309 connected to the collector thereof, from a variation in the sense current flowing through the emitter thereof. A variation in the sense current is taken as a read signal output from the differential amplifier 307. Accordingly, the higher the resistance of the load resistor 309, the higher the level of the read signal output. However, a voltage drop at the load resistor 309 must be kept less than a predetermined value in order to use the transistor 306 as the base-grounded amplifier. Further, the DC current flowing through the load resistor 309 is equal to the sense current to be supplied to the MR read head 102. Accordingly, the resistance of the load resistor 309 cannot be set high. Thus, to keep the voltage drop less than the predetermined value, the gain of the transistor 306 as the base-grounded amplifier cannot be set so high. As a result, the level of noise produced by the differential amplifier 307 becomes relatively high, and therefore the noise of the amplifier 307 must be minimized in order to keep the S/N ratio of the read signal output at a predetermined value. It is expected that the power voltage (Vcc) of the magnetic disk drive system will be varied from 5V (at present) to 3.3V in order to save the power consumption. Where the power voltage is reduced, a demand for lower noise is more and more increased.

Since in the driving circuit of a structure as shown in FIG. 8, part of the sense current (DC current) to be supplied to the MR read head 102 is supplied from the constant current source 500, the DC current component of a current flowing through the load resistor 309 can be lowered. Thus, even if the resistance of the load resistor 309 is increased, the base-grounded amplifier formed by the transistor 306 can be operated normally by minimizing the voltage drop at the load resistor 309. On the other hand, the overall current component which varies in accordance with a variation in the resistance of the read head 102 flows through the load resistor 309. Accordingly, the gain of the transistor 306 (as the base-grounded amplifier) can be increased by increasing the resistance of the load resistor 309.

Figure 9:
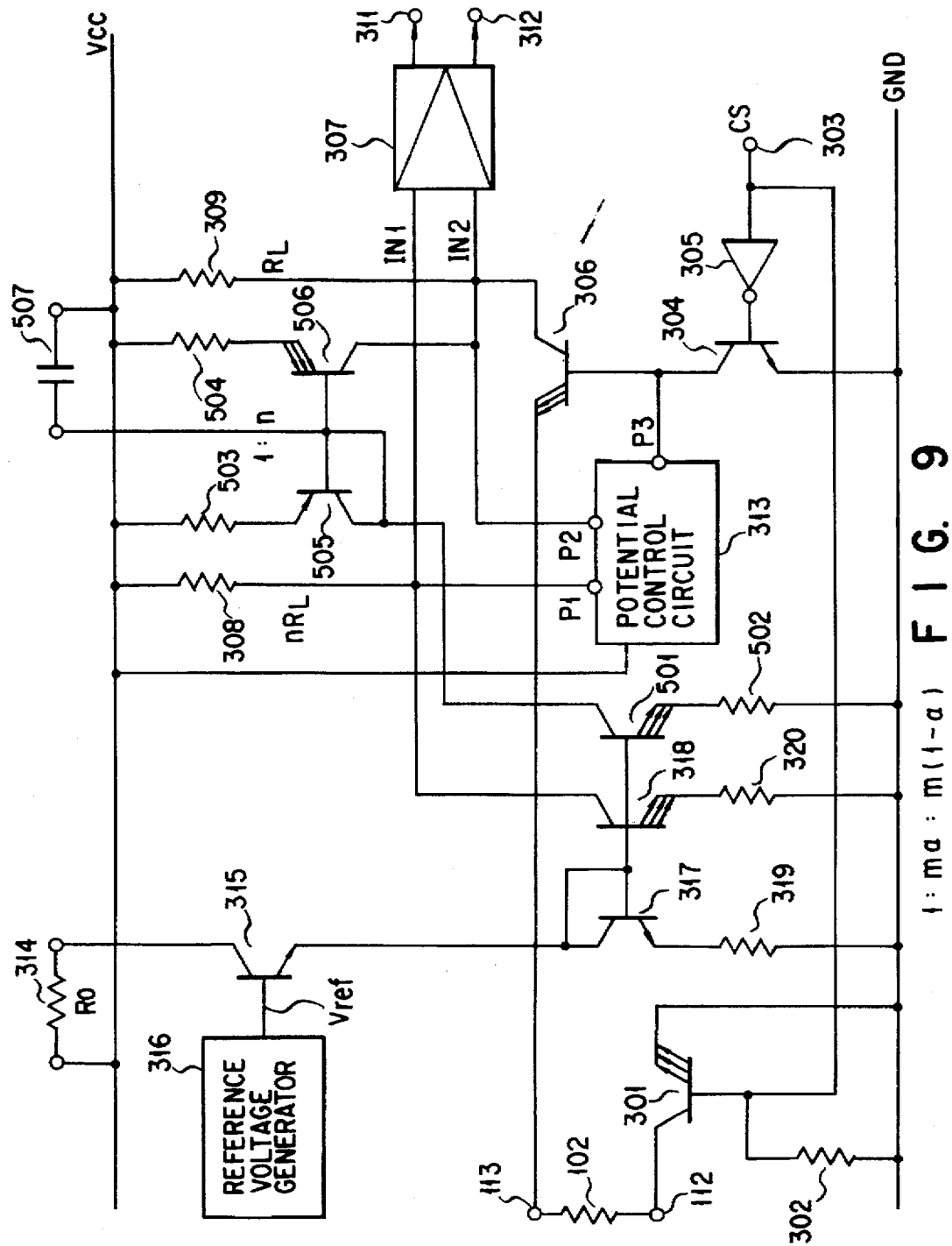
FIG. 9 is a circuit diagram, showing in more detail the read circuit of FIG. 8.

FIG. 9 shows the structure of FIG. 8 in more detail. In order to absolutely accurately control the sense current to be supplied to the MR read head 102, the current value of the constant current source 500 shown in FIG. 8 must be accurately controlled. The FIG. 9 structure can satisfy this demand. In FIG. 9, the constant current source 500 comprises a transistor 501, resistors 502, 503 and 504, transistors 505 and 506 and a capacitor 507 of a large capacitance provided as an exterior element of the driving IC. The transistor 501 has a base thereof connected to the bases of the transistors 317 and 318 which constitute the first current mirror circuit, and an emitter thereof connected to the ground terminal GND via the resistor 502. Thus, the transistor 501 functions as part of the first current mirror circuit.

The transistor 505 having its collector and base connected to each other in a diode fashion, and the transistor 506 having its base connected to the base of the transistor 505 constitute a second current mirror circuit. The emitters of the transistors 505 and 506 are connected to the power supply terminal Vcc via the resistors 503 and 504, respectively. The collector of the transistor 505 is connected to the collector of the transistor 502. The collector of the transistor 506 is connected to the second input terminal IN2 of the differential amplifier 307. Further, a common connection node between the bases of the transistors 505 and 506 is connected to the power supply terminal vcc via the capacitor 507.

A current corresponding to the output current of the constant current source 500 in FIG. 8 flows into the collector of the transistor 506. The ratio between the current flowing through the load resistor 309 and the collector current of the transistor 506 is set to $\alpha:(1-\alpha)$ ($0<\alpha<1$). The ratio between the resistances of the resistors 319, 320 and 502 connected to the first current mirror circuit is set to $1:m\alpha:m(1-\alpha)$. The current flowing through the resistor 319 is equal to the reference current determined from the reference voltage Vref and the resistance of the resistor 314. Supposing that the current value of the resistor 319 is Iref, the currents flowing through the resistors 320 and 502, i.e., the collector currents of the transistors 318 and 501 are $m\alpha\times$Iref and $m(1-\alpha)$ Iref, respectively. The ratio between the resistances of the resistors 503 and 504 connected to the second current mirror circuit is set to 1:n. Accordingly, the current flowing through the resistor 504 (i.e., the collector current of the transistor 506) is a value n-times higher than the current flowing through the resistor 502 (i.e., the collector current of the transistor 501), i.e., mn $((1-\alpha))$ Iref. The current flowing through the resistor 308 is $m\alpha\times$Iref, which is equal to the collector current of the transistor 318, and hence the voltage drop at the resistor 308 is $mn\alpha\times R_L\times$Iref. Since the input terminals P1 and P2 of the potential control circuit 313 have the same potential as aforementioned, the voltage drop at the resistor 308 is equal to that at the resistor 309. Therefore, the current flowing through the load resistor 309 is $mn\alpha\times$Iref. Accordingly, ratio between the current flowing through the load resistor 309 and the collector current of the transistor 506 becomes $\alpha:(1-\alpha)$, and the sense current to be supplied to the MR read head 102 is accurately kept at mn×Iref. In other words, the output current of the constant current source 500 can accurately correspond to the sense current.

Noise generated in the read circuit of FIG. 9, in particular, noise contained in the read signal output of the read circuit will now be explained. The noise includes (1) a thermal noise generated due to the resistance of the base of the transistor 306, (2) a shot noise contained in the collector current of the transistor 306, (3) a thermal noise generated by the load resistor 309, (4) a thermal noise generated due to the resistance of the base of the transistor 506, (5) a shot noise contained in the collector current of the transistor 506, and (6) a thermal noise generated by the resistor 504. On the other hand, noises generated due to the resistance of the base of the transistor 506 and in the resistor 503 can be removed from the noises contained in the read signal output by short-circuiting the base of the transistor 506 to the power supply terminal Vcc via the capacitor 507 of a large capacitance.

Although the noise (1) is relatively high, it is hard in principle to remove. However, the noises (2)–(6) are sufficiently low, the sum of the noises contained in the read signal output can be kept at a value falling within a practically allowable range. As regards the noises (2)–(6), the shot noises (2) and (5) can almost be ignored since the sense current to be supplied to the MR read head 102 is as high as several mA—ten and several mA. The noise (3) decreases as the gain of the transistor 306 increases in accordance with an increase in the resistance of the load resistor 309. The noise (4) can be ignored by sufficiently reducing the resistance of the base of the transistor 506. Since the transistor 506 is used as a constant current source, and no signal current flows therethrough, it is not required for the transistor 506 to have high-frequency performance. In light of this, the base resistance of the transistor 506 is reduced by constituting the transistor 506 by a lateral PNP transistor. Since the lateral PNP transistor has a large base area, it has a low base resistance, though having inferior high-frequency performance. Experiments performed by the inventors of this invention have confirmed that the thermal noise generated due to the base resistance of the lateral PNP transistor is extremely low, as compared with cases using other type transistors. As regards the noise (6), it is necessary to estimate the noise also in consideration of a reduction in noise according to an increase in the resistance of the load resistor 309. Here, an increase in noise resulting from summing an increase in noise due to the thermal noise produced by the resistor 504 and a decrease in noise due to an increase in the resistance of the load resistor 309 will be explained.

Where the voltage drop at the load resistor 309 is represented by V and the sense current to be supplied to the MR read head 102 is represented by I, the resistance of the load resistor 309 is expressed by V/αI. On the other hand, the resistance of the resistor 504 is set to (V−Vf)/(1−α) I at maximum so as not to saturate the transistor 506, where Vf represents a forward voltage drop at a pn-junction of the transistor. In this case, the equivalent input noises relating to the thermal noises generated by the load resistor 309 and the resistor 504 are given by the following formulas (1) and (2), respectively:

$$(4kT \times R_{mr}^2 \times \alpha I/V)^{1/2} \quad (1)$$

$$\{4kT \times R_{mr}^2 \times (1-\alpha)I/(V-Vf)\}^{1/2} \quad (2)$$

where k represents the Boltzmann's constant, T temperature, and $R_{mr}$ the resistance of the MR element of the MR read head 102.

The thermal noises generated by the load resistor 309 and the resistor 504 have no relationship therebetween. Accordingly, the sum of the thermal noises of the load resistor 309 and the resistor 504 corresponds to the sum of mean square values thereof and is given by the following formula (3):

$$\{4kT \times R_{mr}^2 \times I(V-\alpha Vf)/(V(V-Vf))\}^{1/2} \quad (3)$$

Where there is no constant current source 500, the equivalent input noise relating to the thermal noise produced by the load resistor 309 is calculated by substituting α by 1 in formula (1). Thus, the sum of the thermal noises generated by the resistors 309 and 504 expressed by formula (3) is $\{(V-\alpha Vf)/(V-Vf)\}^{1/2}$ times the sum produced in the case of using no constant current source 500. In the range of $0 \leq \alpha \leq$, the sum increases monotonously as α decreases. Accordingly, decreasing the current to be supplied to the load resistor 309 increases the noise (6). To minimize the noise increase, the voltage drop at the load resistor 309 must be set to as high a value as possible.

As described above, the constant current source 500 enables the transistor 306 as the base-grounded amplifier to have a high gain, also enables the influence of the noise of the differential amplifier 307, connected to the transistor 506, to be minimized, and enables an increase in the noise due to the constant current source 500 to be restrained. As a result, a high S/N read circuit can be realized.

Another embodiment of the invention will now be explained with reference to FIGS. 10A and 10B. FIGS. 10A and 10B show a second embodiment of the composite head unit which additionally employs a bias conductor 103. The bias conductor 103 is located adjacent to the read head 102 consisting of an MR head, and generates a magnetic field when a bias current has been supplied thereto. The magnetic field as a bias magnetic field is applied to the MR element of the read head 102. As a result of the application of the bias magnetic field, the read head 102 can accurately detect written magnetization on the magnetic disk in that linear region of the MR element in which the magnetic-resistance characteristics have a great slope.

In the case of FIG. 10A, the bias conductor 103 is connected to the read head 102 in series between the first and second terminals 111 and 112. In the case of FIG. 10B, the bias conductor 103 is connected parallel to the read head 102. Composite head units 100A and 100B shown in FIGS. 10A and 10B each have a three-terminal structure as in the case of the composite head unit 100 of FIG. 1. Therefore, the driving circuit may have the same structure as that employed in the first embodiment. In the composite head unit 100A of FIG. 10A, the sense current and the bias current are set equal to each other. Further, in the composite head unit 100B of FIG. 10B, the sense current and the bias current are determined on the basis of the ratio between the resistances of the read head 102 and the bias conductor 103.

FIG. 11 shows a magnetic disk drive system according to a third embodiment of the invention. In FIG. 11, elements similar to those employed in FIG. 5 are denoted by corresponding reference numerals, and an explanation will be given only of different elements.

A composite head unit 100C in this embodiment comprises an inductive write head 101, an MR read head 102 and a bias conductor 103 which are connected in series in this order. A first terminal 111 is drawn from an end of the read head 101, a third terminal 113 is drawn from a first common connection node N1 between the other end of the read head 101 and an end of the read head 102, another third terminal 114 is drawn from a second common connection node N2 between the other end of the read head 102 and an end of the bias conductor 103, and a second terminal 112 is drawn from the other end of the bias conductor 103. Thus, the composite head unit 100C has four terminals.

A driving circuit 200C connected to the terminals 111–114 differs from the driving circuit 200 shown in FIG. 5 in that it additionally has a switch S5 and a bias current source 203. The bias current source 203 is provided for supplying a bias current to the bias conductor 103, and connected to the terminal 112 via the switch S5.

The operation of this embodiment at writing is similar to that of the embodiment of FIG. 5. The switches S1 and S2 are set in the on-state, while the switches S3–S5 are set in the off-state. At this time, a bias current is supplied from the bias current source 203 to the bias conductor 103 via the switches S5 and S3. Thus, unlike the cases of using the composite head units 100A and 100B of FIGS. 10A and 10B, the bias current can be set to an optimal value irrespective of the sense current.

In the conventional composite head unit in which the bias current is supplied to the bias conductor independent of the sense current, the write head, the read head and bias conductor have independent terminals, and hence the composite head unit has five terminals. On the other hand, this embodiment employs only four terminals as described above.

FIG. 12 shows a magnetic disk drive system according to a fourth embodiment of the invention. In this embodiment, elements similar to those in FIG. 5 are denoted by corresponding reference numerals, and an explanation will be given only of different elements. A composite head unit 100D in this embodiment comprises an inductive write head 101, a bias conductor 103 and an MR read head 102 which are connected in series in this order. A first terminal 121 is drawn from an end of the read head 101, a third terminal 123 is drawn from a common connection node N3 between the other end of the read head 101 and an end of the read head 102, another third terminal 124 is drawn from a common connection node N2 between the other end of the read head 102 and an end of the bias conductor 103, and a second terminal 122 is drawn from the other end of the bias conductor 103. Thus, the composite head unit 100D has four terminals.

A driving circuit 200D connected to the terminals 121–124 has a structure similar to the circuit of FIG. 11.

However, in accordance with that the relationship in position between the read head 102 and the bias conductor 103 in FIG. 12 is reverse to that of FIG. 11, the FIG. 12 structure differs from the FIG. 11 structure further in that the emitter of the transistor Q1 is connected to the terminal 122 and an end of the switch S5 is connected to the terminal 123. Since the basic operation of the FIG. 12 structure is similar to that of the FIG. 11 structure, no explanation will be given of the operation.

FIG. 13 shows a magnetic disk drive system according to a fifth embodiment of the invention. In this embodiment, elements similar to those in FIG. 5 are denoted by corresponding reference numerals, and an explanation will be given only of different elements. A composite head unit 100E in this embodiment comprises two MR read heads 102 and 104. The read heads 102 and 104 are arranged in the longitudinal direction (linear density direction) of a writing track on the magnetic disk with a predetermined gap therebetween, and are electrically connected to an inductive write head 101 in series. A first terminal 131 is drawn from an end of the read head 101, a third terminal 133A is drawn from a first common connection node N1 between the other end of the read head 101 and an end of the read head 102, another third terminal 133B is drawn from a second common connection node N4 between the other end of the read head 102 and an end of the read head 104, and a second terminal 132 is drawn from the other end of the read head 104. Thus, the composite head unit 100D has four terminals.

In a driving circuit 200E connected to the terminals 131–134, a transistor Q2 which has the same function as the transistor Q1 is additionally employed corresponding to the additional MR read head 104 in the read circuit. The bias resistor Re1, the switch S4 and the voltage source E1 may be commonly connected to the transistors Q1 and Q2. Alternatively, a bias resistor Re2, a switch S7 and a voltage source 2 dedicated to the transistor Q2 may be additionally employed.

The amplifier 202 in the read circuit is a differential amplifier in this embodiment, which has two input terminals connected to the collectors of the transistors Q1 and Q2. The composite head unit 100E functions also as a bias conductor for applying a bias magnetic field to the read heads 102 and 104. In a magnetization-shifting region on the magnetic disk, the resistances of the read heads 102 and 104 vary in opposite directions. Specifically, if one of the resistance of the read heads 102 and 104 increases, the other decreases. Accordingly, the read signal outputs of the read heads 102 and 104 have phases inverted each other. Thus, a read signal can be output from the signal output terminals 212 and 213 as a result of calculating a difference between the read signals of the read heads 102 and 104 by means of the differential amplifier 202.

As described above, since in the conventional composite head unit with two MR heads, terminals drawn from the write head and those drawn from the read head are independent of each other, the conventional composite head unit has five or six terminals. On the other hand, in the composite head unit 200E employed in this embodiment has only four terminals.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic disk drive system for writing data into a disk-shaped magnetic medium and reading data stored therein, comprising:

a first terminal, a second terminal, and a third terminal; and a composite head unit including an inductive write only head having a write coil and at least one magnetoresistive read only head having at least one MR element, the write coil and the at least one MR element being connected in series between the first and second terminals, and a common connection node between the write coil and the MR element, the common connection node being connected to the third terminal.

2. The system according to claim 1, wherein the common connection node includes a node connecting the write only head to the read only head.

3. The system according to claim 1, wherein the composite head unit further includes a bias conductor connected to the read only head in series or parallel thereto between the second terminal and the at least one third terminal, for applying a bias magnetic field to the read only head.

4. The system according to claim 1, wherein the composite head unit further includes a bias conductor connected between the write only head and the read only head for applying a bias magnetic field to the read head; a first common connection node connecting the bias conductor to the write only head; and a second common connection node connecting the bias conductor to the read only head; the first common connection node being connected to one of the at least one third terminal, and the second common connection node being connected to another of the at least one third terminal.

5. The system according to claim 4, further comprising:
a write circuit for supplying a write current to the write only head;
a read circuit for supplying a sense current to the read only head to generate a read signal;
a bias current source for supplying a bias current to the bias conductor; and
switch means for connecting the write circuit to the write only head and electrically disconnecting the read circuit and the bias current source from the composite head unit and the write circuit during writing, and for connecting the read circuit and bias current source to the read only head and the bias conductor, respectively, and electrically disconnecting the write circuit from the composite head unit, the read circuit and the bias current source during reading.

6. The system according to claim 5, wherein the switch means includes at least one first switch interposed between the write only head and the write circuit, the at least one first switch being turned on during writing and turned off during reading; a second switch connected to the read only head for interrupting the supply of the sense current to the read only head during writing and supplying the sense current to the same during reading; a third switch for making the read circuit inoperative during writing and operative during reading; and a fourth switch interposed between the bias conductor and the bias current source, and to be turned off during writing and turned on during reading.

7. The system according to claim 1, further comprising:
a write circuit for supplying a write current to the write head;
a read circuit for supplying a sense current to the read head to generate a read signal; and
switch means for connecting the write circuit to the write head and electrically disconnecting the read circuit and the read head from the write circuit during writing, and for connecting the read circuit to the read head and electrically disconnecting the write circuit and the write head from the read circuit during reading.

8. The system according to claim 7, wherein the switch means includes at least one first switch interposed between the write only head and the write circuit, the at least one first switch being turned on during writing and turned off during reading; a second switch connected to the read only head for interrupting the supply of the sense current to the read only head during writing and supplying the sense current to the same during reading; and a third switch for making the read circuit inoperative during writing and operative during reading.

9. A magnetic disk drive system for writing data into a disk-shaped magnetic medium and reading data stored therein, comprising:
a first terminal, a second terminal, and a third terminal;
a composite head unit including an inductive write only head having a write coil and at least one magnetoresistive read only head having at least one MR element, the write coil and the at least one MR element being connected in series between the first and second terminals, and a common connection node between the write coil and the MR element, the common connection node being connected to the third terminal;
a write circuit for supplying a write current to the write coil of the write only head;
a read circuit for supplying a sense current to the MR element of the read only head to generate a read signal, the read circuit including a transistor having an emitter thereof connected to an end of the MR element of the read only head, a load resistor connected between the collector of the transistor and a power supply terminal, and a constant current source connected parallel to the load resistor; and
switch means for connecting the write circuit to the write coil of the write only head and electrically disconnecting the MR element of the read head of the composite head unit from the read circuit and the write circuit during writing, and for connecting the read circuit to the read head and electrically disconnecting the write coil of the write only head of the composite head unit from the write circuit and the read circuit during reading.

10. The system according to claim 9, wherein the switch means includes at least one first switch interposed between the write only head and the write circuit, the at least one first switch being turned on during writing and turned off during reading; a second switch connected to the read only head for interrupting the supply of the sense current to the read only head during writing and supplying the sense current to the same during reading; and a third switch for making the read circuit inoperative during writing and operative during reading.

11. The system according to claim 9, wherein the read circuit further includes a differential amplifier, having two input terminals, for amplifying a voltage drop at the load resistor to generate a read signal output, and a potential control means for controlling the potential of the base of the transistor so that the input terminals of the differential amplifier can receive the same DC potential.

12. The system according to claim 9, wherein the read circuit further includes current-setting means for setting a current supplied from the constant current source to a predetermined value.

13. The system according to claim 12, wherein
the current-setting means includes reference current means for generating a reference current of the predetermined value, and a first current mirror circuit for receiving the reference current as an input current and outputting an output current corresponding to the input current; and
the constant current source includes a second current mirror circuit for receiving the output current of the first current mirror circuit as an input current and outputting an output current corresponding to the input current.

14. A magnetic disk drive system for writing data into a disk-shaped magnetic medium and reading data stored therein, comprising:
a first terminal, a second terminal, and a third terminal; and
a composite head unit including an inductive write only head having a write coil and at least one magnetoresistive read only head having at least one MR element, the write coil and the at least one MR element being connected in series between the first and second terminals, and a common connection node between the write coil and the MR element, the common connection node being connected to the third terminal, and said magnetoresistive read only head being open-circuited during reading.

15. A magnetic disk drive system for writing data into a disk-shaped magnetic medium and reading data stored therein, comprising:

a first terminal, a second terminal, a third terminal, and fourth terminal; and a composite head unit including an inductive write only head having a write coil and a magnetoresistive read only head having a MR element and a bias conductor which are connected in series to each other, with the write coil and the magnetoresistive read only head being connected in series between the first and second terminals, a first common connection node between the write coil and the MR element, and a second common connection node between the MR element and the bias conductor, the first common connection node being connected to the third terminal, and the second common connection node being connected to the fourth terminal.

16. A magnetic disk drive system for writing data into a disk-shaped magnetic medium and reading data stored therein, comprising:

a first terminal, a second terminal, a third terminal, and a fourth terminal;

a composite head unit including an inductive write only head having a write coil and a magnetoresistive read only head having a MR element and a bias conductor which are connected in series to each other, the write coil and the magnetoresistive read only head being connected in series between the first and second terminals, a first common connection node between the write coil and the MR element, and a second common connection node between the MR element and bias conductor, the first common connection node being connected to the third terminal and the second common connection node being connected to the fourth terminal;

a write circuit for supplying a write current to the write coil of the write only head;

a read circuit for supplying a sense current to the MR element of the read only head to generate a read signal, the read circuit including a transistor having an emitter connected to an end of the MR element of the read only head and a collector, a load resistor connected between the collector of the transistor and a power supply terminal, and a constant current source connected in parallel to the load resistor; and switch means for connecting the write circuit to the write coil of the write only head and electrically disconnecting the MR element of the read head of the composite head unit from the read circuit and the write circuit during writing, and for connecting the read circuit to the read head and electrically disconnecting the write coil of the write only head of the composite head unit from the write circuit and the read circuit during reading.

17. A magnetic disk drive system for writing data into a disk-shaped magnetic medium and reading data stored therein, comprising:

a first terminal, a second terminal, a third terminal, and a fourth terminal; and a composite head unit including an inductive write only head having a write coil and a magnetoresistive write only head having a write coil and a magnetoresistive read only head having a MR element and a bias conductor which are connected in series to each other, the write coil and the MR element being connected in series between the first and second terminal via the bias conductor, a first common connection node between the write coil and the MR element, and a second common connection node between the MR element and the bias conductor, the first common connection node being connected to the third terminal and the second common connection node being connected to the fourth terminal; and means for opening said magnetoresistive read only head during reading.

* * * * *